(12) United States Patent
Yamada

(10) Patent No.: US 11,211,085 B2
(45) Date of Patent: Dec. 28, 2021

(54) DISK DEVICE SUSPENSION HAVING A LOAD BEAM PROVIDED WITH A DAMPER MEMBER TO WHICH AN OUTRIGGER IS ATTACHED

(71) Applicant: NHK SPRING CO., LTD., Yokohama (JP)

(72) Inventor: Yukie Yamada, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 0 days.

(21) Appl. No.: 17/196,739

(22) Filed: Mar. 9, 2021

(65) Prior Publication Data

US 2021/0287698 A1 Sep. 16, 2021

(30) Foreign Application Priority Data

Mar. 11, 2020 (JP) .............................. JP2020-041726

(51) Int. Cl.
*G11B 5/48* (2006.01)
*G11B 5/55* (2006.01)

(52) U.S. Cl.
CPC .......... *G11B 5/4833* (2013.01); *G11B 5/4826* (2013.01); *G11B 5/5582* (2013.01); *G11B 5/486* (2013.01)

(58) Field of Classification Search
None
See application file for complete search history.

(56) References Cited

U.S. PATENT DOCUMENTS

| 6,967,821 | B2 | 11/2005 | Himes et al. |
| 10,748,565 | B1* | 8/2020 | Nakayama et al. . G11B 5/4833 |
| 10,991,388 | B1* | 4/2021 | Yamada ............... G11B 5/5582 |
| 2003/0011936 | A1 | 1/2003 | Himes et al. |
| 2010/0079915 | A1 | 4/2010 | Kido |

FOREIGN PATENT DOCUMENTS

JP 2010086630 A 4/2010

* cited by examiner

*Primary Examiner* — Craig A. Renner
(74) *Attorney, Agent, or Firm* — Holtz, Holtz & Volek PC

(57) ABSTRACT

A suspension for a disk device comprises a load beam, a flexure and a damper member. The flexure overlaps the load beam, and comprises a tongue on which a slider is mounted and an outrigger connected to the tongue. The damper member is attached to the load beam. The outrigger comprises an arm opposing the load beam, and a folded portion extending from the arm and folded back in a thickness direction of the arm. Further, the folded portion is attached to the damper member.

11 Claims, 13 Drawing Sheets

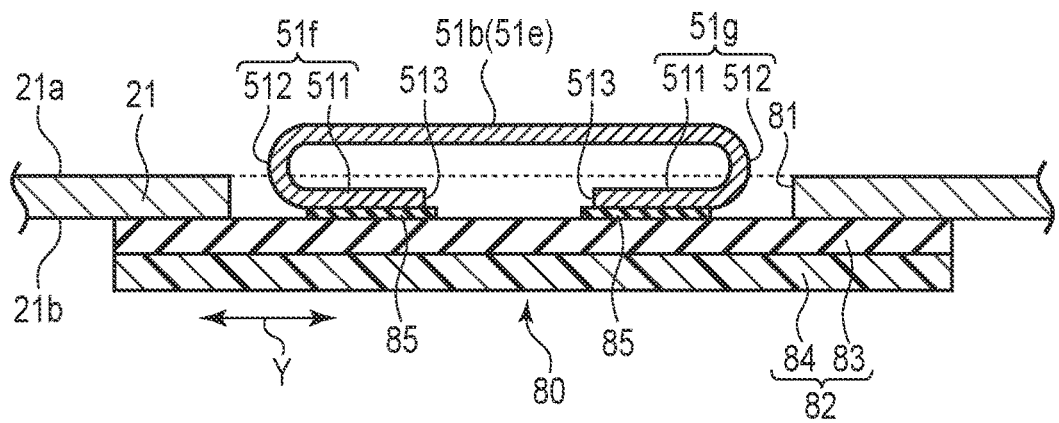
F I G. 18
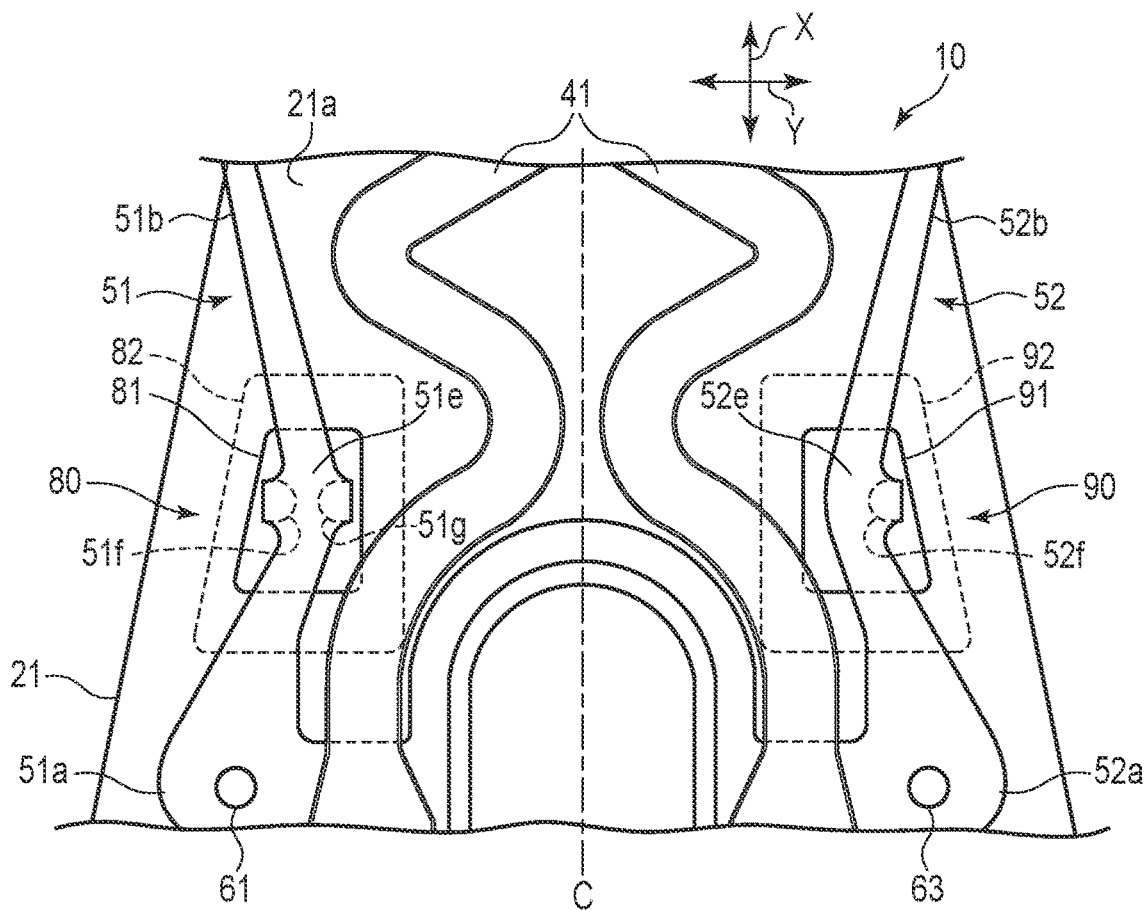
F I G. 19

DISK DEVICE SUSPENSION HAVING A LOAD BEAM PROVIDED WITH A DAMPER MEMBER TO WHICH AN OUTRIGGER IS ATTACHED

CROSS-REFERENCE TO RELATED APPLICATIONS

This application is based upon and claims the benefit of priority from prior Japanese Patent Application No. 2020-041726, filed Mar. 11, 2020, the entire contents of which are incorporated herein by reference.

BACKGROUND OF THE INVENTION

1. Field of the Invention

The present invention relates to a suspension for a disk device used for hard disk drives or the like.

2. Description of the Related Art

Hard disk drives (HDDs) are used in data processors such as personal computers and the like. The hard disk drives include a magnetic disk rotating around a spindle, a carriage pivoting around a pivot shaft and the like. The carriage includes an actuator arm and pivots around the pivot shaft in a width direction of a track of the disk by a positioning motor such as a voice coil motor.

A disk drive suspension (simply referred to as a suspension hereinafter) is attached to the actuator arm. The suspension includes a load beam and a flexure overlaid on the load beam and the like. At gimbal portion formed near a distal portion of the flexure, a slider which constitutes a magnetic head is provided. On the slider, an element (transducer) is provided for carrying out access such as read or write of data and the like. The load beams, the flexure, the slider and the like constitute a head gimbal assembly.

The gimbal portion includes a tongue on which the slider is mounted and a pair of outriggers formed on respective sides of the tongue. The outriggers have such a shape that stretches out to respective sides of the flexure. Both longitudinal end portions of each outrigger are fixed to the load beam by, for example, laser welding or the like. Each outrigger can flex like a spring in a thickness direction and serves an important role to secure the gimbal movement of the tongue.

In order to be provided for high recording density of disks, it is necessary to further the head gimbal assembly and to become able to position the slider to a record surface of a disk at higher precision. In order to achieve this, shaking of the flexure needs to be suppressed as much as possible while securing the gimbal movement required by the head gimbal assembly. For example, as disclosed in U.S. Pat. No. 6,967,821 B and JP 2010-086630 A, it is also known that a damper member is provided on a part of the suspension so as to suppress the shaking of the flexure.

In order to lessen the shaking of the flexure caused when a vibration is applied, it is, in some cases, effective to restrain the shaking of an outrigger. Therefore, there has been a proposal of providing a damper member on the outrigger itself. In other words, a damper member is attached to the outrigger so that the outrigger and the damper member move together. However, if a damper member is attached to an outrigger, there arises a problem that the rigidity of the flexure is increased though the shaking of the flexure can be restrained. For example, a flexure in which a damper member extending along the longitudinal direction of the outrigger is attached to the outrigger is not preferable for gimbal movement because the rigidity in a pitch direction and the rigidity in a roll direction are increased as compared to a flexure without a damper member.

BRIEF SUMMARY OF THE INVENTION

An object of the present invention is to provide a suspension for a disk device which can effectively suppress the shaking of the flexure and also can suppress the rigidity of the flexure from increasing.

According to one embodiment, a suspension for a disk device comprises a load beam, a flexure and a damper member. The flexure overlaps the load beam, and comprises a tongue on which a slider is mounted and an outrigger connected to the tongue. The damper member is attached to the load beam. The outrigger comprises an arm opposing the load beam, and a folded portion extending from the arm and folded back in a thickness direction of the arm. Further, the folded portion is attached to the damper member.

For example, the load beam comprises a first surface, a second surface on an opposite side to the first surface and an opening which penetrates from the first surface to the second surface. Further, the outrigger is disposed at the first surface side, the damper member is attached to the second surface and overlaps at least a part of the opening, and the folded portion is attached to the damper member through the opening.

The arm may comprise a bent portion overlapping the opening, and the folded portion may extend from the bent portion. In this case, the outrigger may comprise a pair of folded portions each identical to the folded portion, which extend from respective sides of the load beam in a width direction of the load beam.

The pair of folded portions may be arranged along a width direction of the arm. As another example, the pair of folded portions may be provided in positions displaced from each other along an extending direction of the arm. A distal portion of each of the folded portion may comprise at least one recess portion or projecting portion.

The arm may comprise an opening, and each of the folded portion may extend from an inner edge of the opening of the arm.

The suspension for a disk device, may further comprise an insulating layer disposed between the folded portion and the damper member. In this case, the folded portion may be attached to the damper member via the insulator layer.

The flexure may comprise a pair of outriggers each identical to the outrigger, each including the arm and the folded portion. In this case, the damper member is provided on each of the pair of outriggers and the damper members are spaced apart from each other. As another example, the damper member may have such a size as to overlap both of the pair of outriggers.

According to the suspension for a disk device of such a configuration, the swing of the flexure which includes a tongue and a pair of outriggers can be inhibited effectively. Further, it is possible to inhibit the rigidity of the flexure from increasing, and therefore an adverse effect on the gimbal movement can be avoided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 18 is a schematic cross-sectional view of the first damping portion taken along line F18-F18 in FIG. 17.

FIG. 19 is a schematic plan view of a suspension according to the seventh embodiment.

DETAILED DESCRIPTION OF THE INVENTION

Various embodiments will be described hereinafter with reference to the accompanying drawings.

First Embodiment

Figure 1:
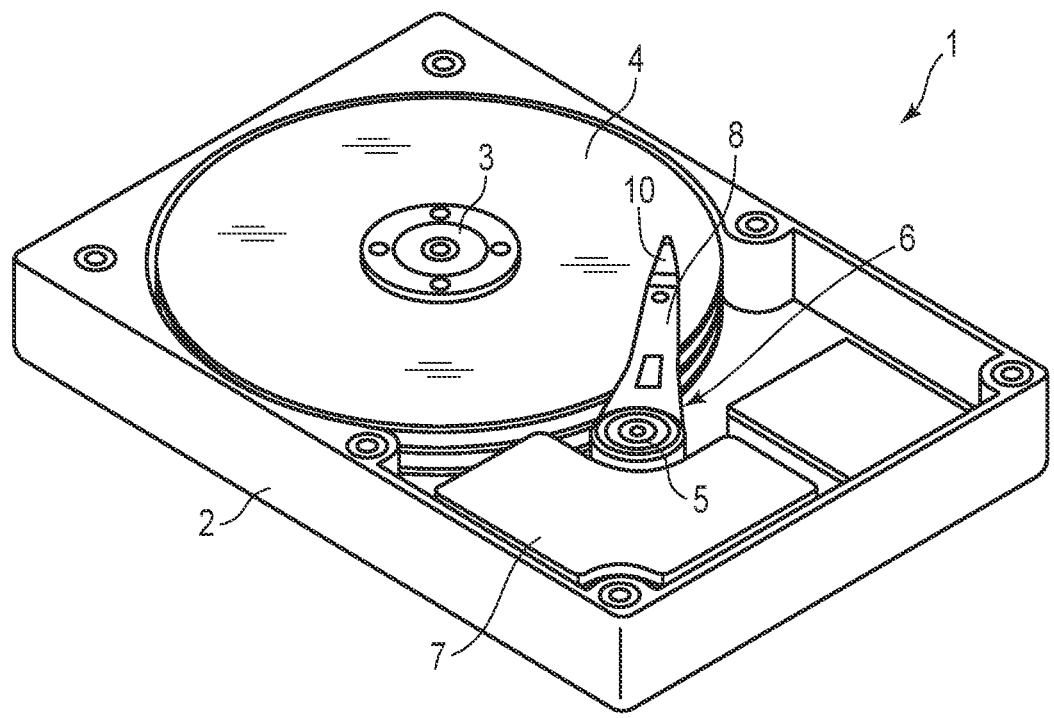
FIG. 1 is a schematic perspective diagram showing an example of a disk device.

FIG. 1 is a schematic perspective diagram showing an example of a disk device (HDD) 1. The disk device 1 comprises a case 2, a plurality of disks 4 rotating around a spindle 3 at center, a carriage 6 pivotable around a pivot shaft 5 at center, and a positioning motor (a voice coil motor) 7 for driving the carriage 6. The case 2 is sealed by a lid (not shown).

Figure 2:
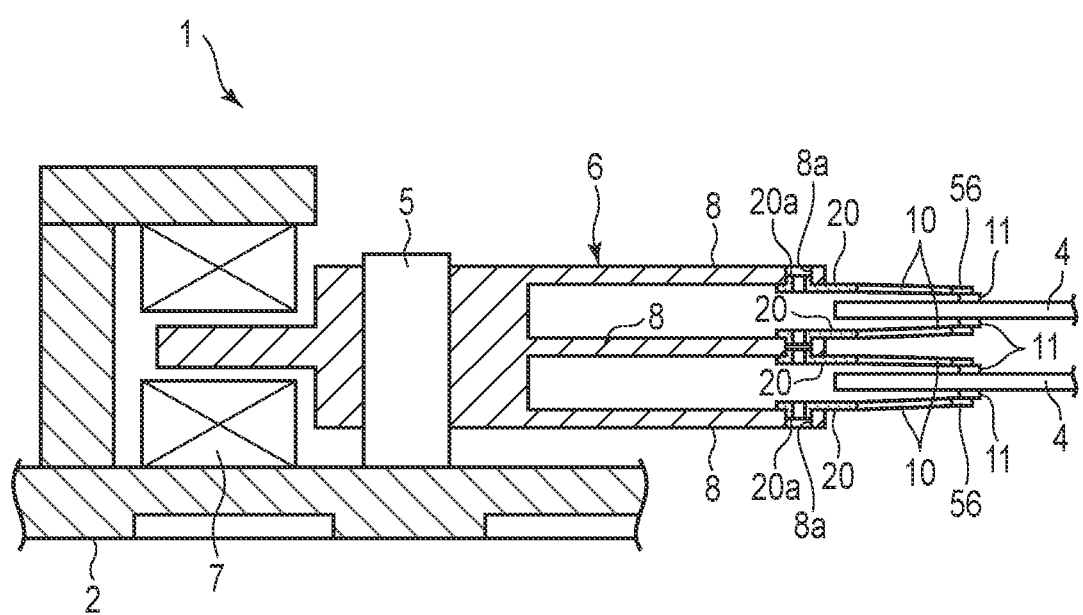
FIG. 2 is a schematic cross-sectional view of the disk device shown in FIG. 1.

FIG. 2 is a schematic cross-sectional view showing a part of the disk device 1. As shown in FIGS. 1 and 2, the carriage 6 is provided with a plurality of arms (carriage arms) 8. At a distal end portion of each arm 8, a suspension 10 is attached. At a distal end portion of each suspension 10, a slider 11, which constitutes a magnetic head, is provided. As a disk 4 rotate at high speed, air flows in between the disk 4 and the slider 11, thereby forming an air bearing.

When the carriage 6 is pivoted by the positioning motor 7, the suspension 10 moves along a diametrical direction of the disk 4 and thus the slider 11 moves to a desired track of the disk 4.

Figure 3:
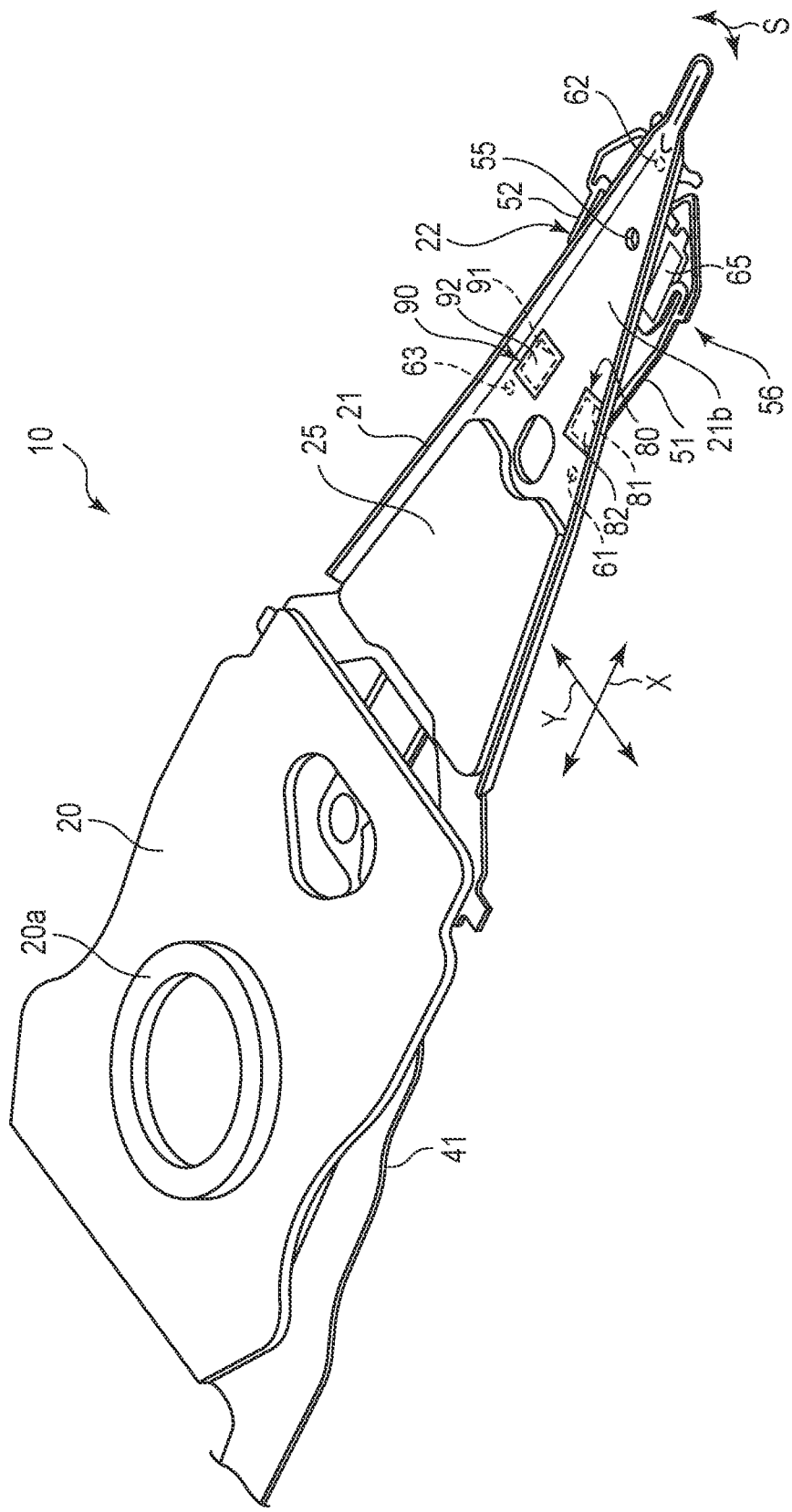
FIG. 3 is a schematic perspective diagram of a suspension for a disk device according to the first embodiment.

FIG. 3 is a schematic perspective diagram of the suspension 10 according to this embodiment. The suspension 10 comprises a base plate 20 fixed to the respective arm 8 (see FIGS. 1 and 2) of the carriage 6, a load beam 21 and a flexure 22. In the base plate 20, a boss member 20a is formed to be inserted to a hole 8a (see FIG. 2) formed in the arm 8.

The flexure 22 is placed along the load beam 21. The load beam 21 and the flexure 22 each extend along a longitudinal direction X of the suspension 10. In the following descriptions, a direction normal to the longitudinal direction X is defined as a width direction Y of the suspension 10, the load beam 21 the flexure 22 and the like. Further, swaying directions S are defined as indicated by arc-like arrows provided near a distal portion of the load beam 21.

Figure 4:
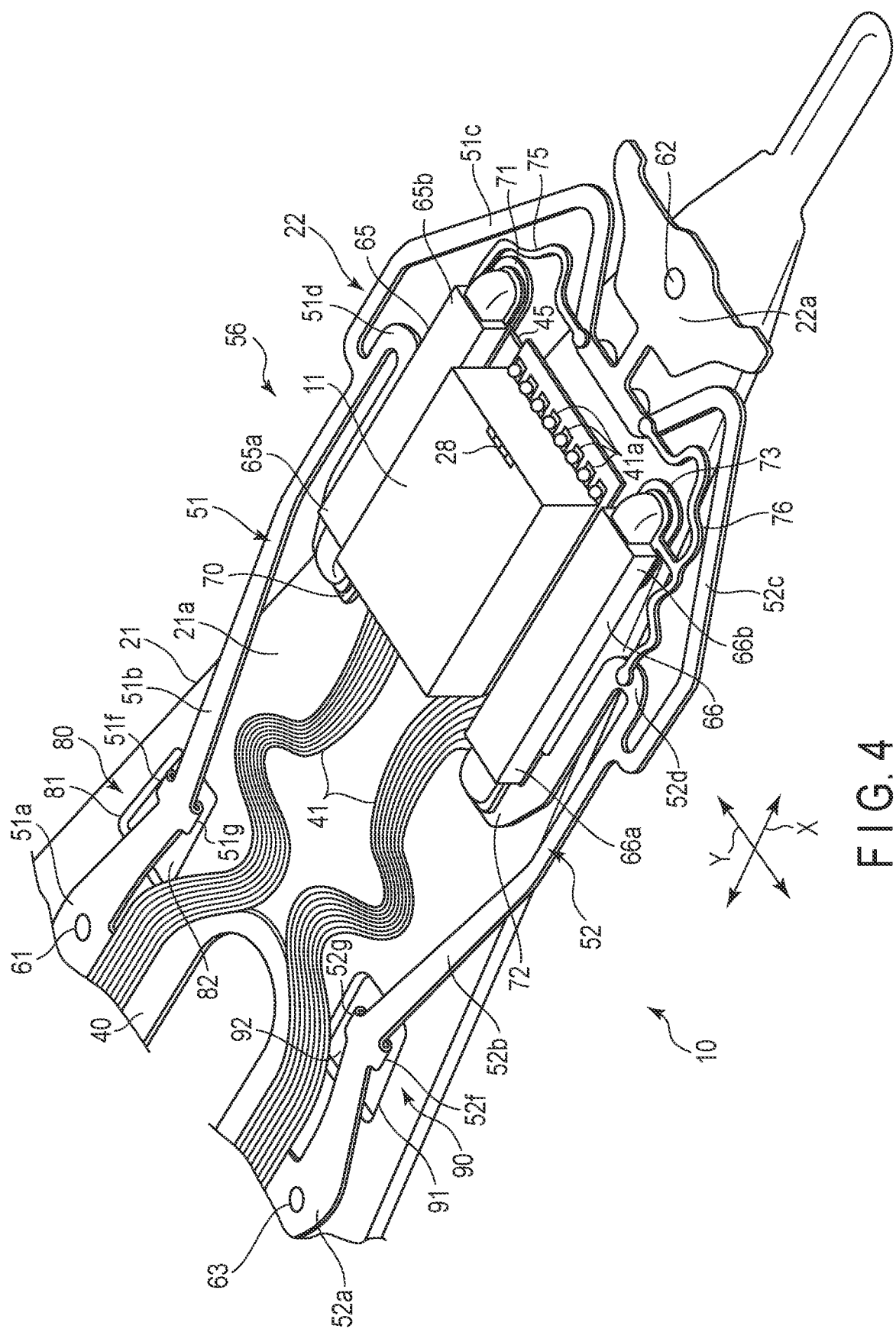
FIG. 4 is a schematic perspective diagram of the suspension shown in FIG. 3 as viewed from a slider side.

FIG. 4 is a schematic perspective diagram of a distal end portion of the slider 11 of the suspension as viewed from a slider side. The load beam 21 comprises a first surface 21a shown in FIG. 4 and a second surface 21b shown in FIG. 3. The first surface 21a is a surface on a side where the flexure 22 is disposed. As shown in FIG. 3, a damper member 25 may be provided on the second surface 21b.

As shown in FIG. 4, in the distal end portion of the slider 11, which constitutes the magnetic head, elements 28 which can convert magnetic signals and electric signals into each other, for example, MR elements, are provided. Accessing including write or read of data to/from a disk 4 is carried out by the elements 28 The slider 11, the load beam 21, the flexure 22 and the like constitute a head gimbal assembly.

The flexure 22 comprises a metal base 40 made from a thin stainless steel plate, and a wiring portion 41 disposed along the metal base 40. The thickness of the metal base 40 is less than the thickness of the load beam 21. The thickness of the metal base 40 should preferably be 12 to 25 μm, and it is, for example, 20 μm. The thickness of the load beam 21 is, for example, 30 μm. Parts of the wiring portion 41 are electrically connected to the elements 28 of the slider 11 via terminals 41a of the slider 11.

Figure 5:
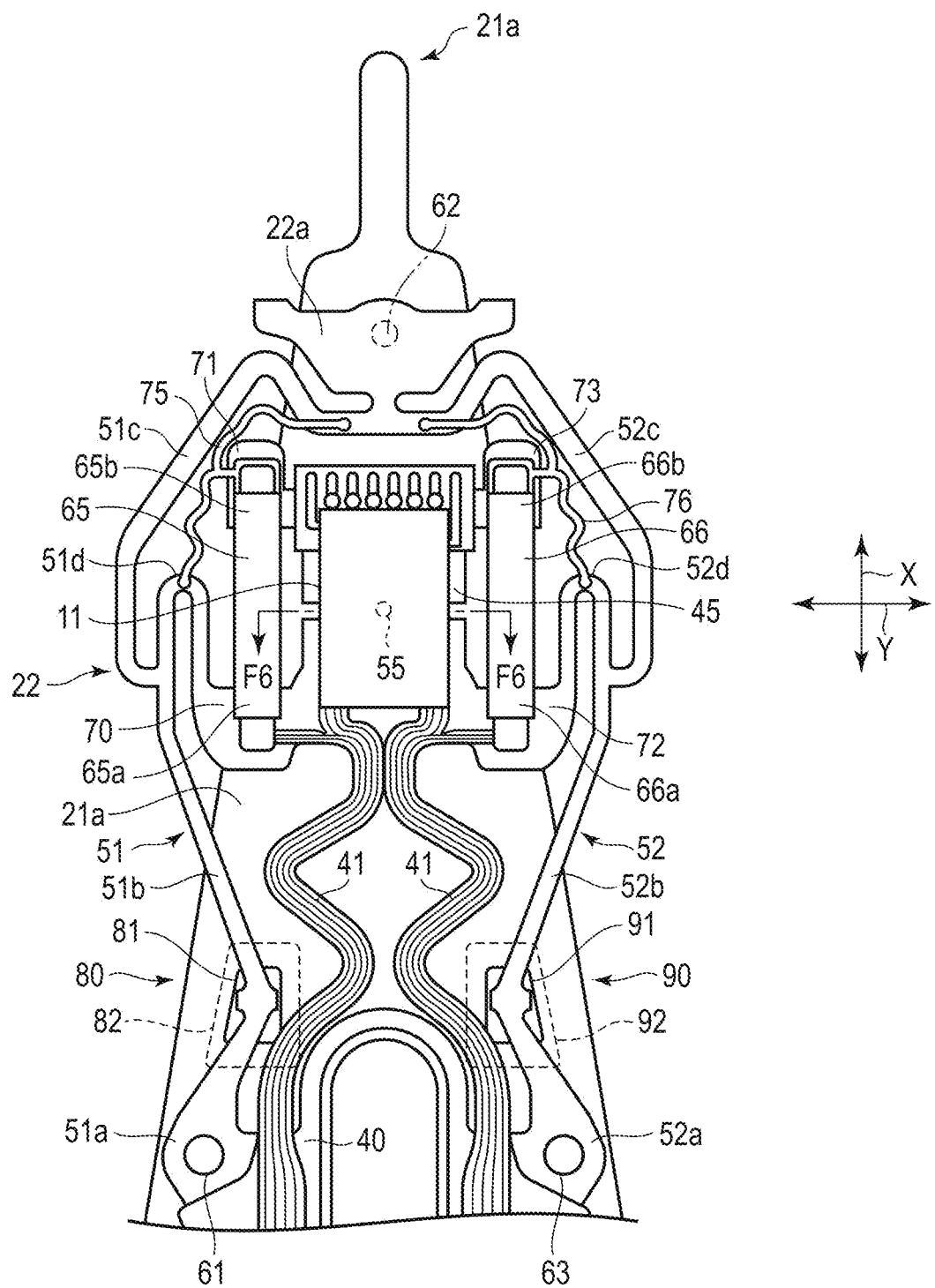
FIG. 5 is a schematic plan view of the suspension shown in FIG. 4.

FIG. 5 is a schematic plan view of a vicinity of the distal end portion of the suspension 10 as viewed from a slider 11 side. The flexure 22 includes a tongue 45, a first outrigger 51 and a second outrigger 52. On the tongue 45, the slider 11 is mounted. The first outrigger 51 and the second outrigger 52 are disposed in respective outer sides of the tongue 45 along the width direction Y.

The first outrigger 51 and the second outrigger 52 have such a shape as to protrude to respective outer sides of the tongue 45 along the width direction. The tongue 45, the first of 51 and the second outrigger 52 are all parts of the metal base 40, and the outline of each of these is formed by, for example, etching.

Figure 6:
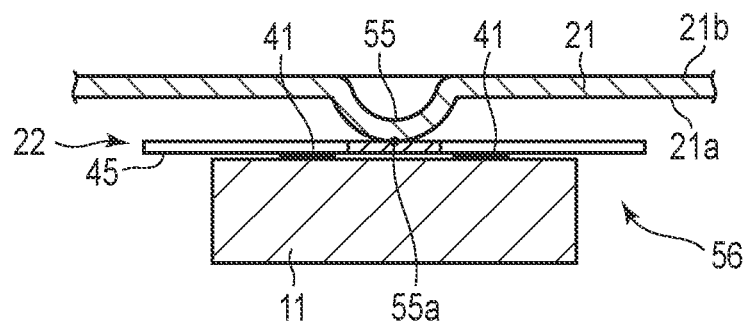
FIG. 6 is a schematic cross-sectional view of the suspension taken along line F6-F6 in FIG. 5.

FIG. 6 is a schematic cross-sectional view of the suspension 10 taken along line F6-S6 in FIG. 5. In the vicinity of the distal end of the load beam 21, a dimple 55 projecting towards the tongue 45 is formed. A tip 55a of the dimple 55 is in contact with the tongue 45. The tongue 45 swings around the tip 55a of the dimple 55 to make a desired gimbal movement. The tongue 45, the first outrigger 51, the second outrigger 52, the dimple 55 and the like constitute a gimbal portion 5.

As shown in FIGS. 4 and 5, the first outrigger 51 is disposed on one outer lateral side of the tongue 45 and extends along the longitudinal direction X of the flexure 22. The second outrigger 52 is disposed on the other outer lateral side of the tongue 45 and extends along the longitudinal direction X.

The first outrigger 51 includes a first proximal end portion 51a, a first proximal end arm 51b, a first distal end arm 51c and a first joint portion 51d. The first proximal end portion 51a is fixed to the load beam 21 by a fixing portion 61. The first proximal end arm 51b extends from the first proximal end portion 51a towards the distal end of the flexure 22. An end of the first distal end arm 51c is connected to the first proximal end arm 51b, and the other end is connected to the distal end portion 22a. The first joint portion 51d connects the distal end of the first proximal end arm 51b and one side portion of the tongue 45 to each other. The distal end portion 22a is fixed near the distal end portion of the load beam 21 by a fixing portion 62. The fixing portions 61 and 62 are formed by, for example, laser spot welding or the like.

The second outrigger 52 has a shape similar to that of the first outrigger 51. That is, the second outrigger 52 includes a second proximal end portion 52a, a second proximal end arm 52b, a second distal end arm 52c and a second joint portion 52d. The second proximal end portion 52a is fixed to the load beam 21 with a fixing portion 63, which is formed by, for example, by laser spot welding or the like.

As described above, both end portions of the first outrigger 51 along the longitudinal direction X are supported by the fixing portions 61 and 62, respectively. Further, both end portions of the second outrigger 52 along the longitudinal direction X are supported by the fixing portions 62 and 63. With this structure, a part of the first outrigger 51, which is located between the fixing portions 61 and 62, and a part of the second outrigger 52, located between the fixing portions 62 and 63 can flex along the thickness direction of the metal base 40. Thus, the tongue 45 is supported elastically by the first outrigger 51 and the second outrigger 52, and it can swing around the dimple 55 as a fulcrum.

On the gimbal portion 56, a first microactuator element 65 and a second microactuator element 66 are mounted. The microactuator elements 65 and 66 are each formed of a piezoelectric material, and are placed on respective sides of the slider 11 along the width direction Y. Both end portions 65a and 65b of the first microactuator element 65 are fixed respectively to actuator support members 70 and 71 of the tongue 45. Both end portions 66a and 66b of the second microactuator element 66 are fixed respectively to actuator support members 72 and 73 of the tongue 45.

The microactuator elements 65 and 66 have a function to pivot the tongue 45 in the swaying directions S (see FIG. 3). In the example shown in FIGS. 4 and 5, a limiter member 75 which suppresses excessive swing of the tongue 45 is provided between one side portion of the tongue 45 and the first outrigger 51. A limiter member 76 is also provided between the other side portion of the tongue 45 and the second outrigger 52.

As shown in FIGS. 3 to 5, the suspension 10 of this embodiment comprises a first damping portion 80 and a second damping portion 90, which suppress the vibration of the flexure 22. The first damping portion 80 is provided in the vicinity of the first proximal end portion 51a of the first outrigger 51, and the second damping portion 90 is provided in the vicinity of the second proximal end portion 52a of the second outrigger 52. Details of the first damping portion 80 and the second damping portion 90 will be described.

Figure 7:
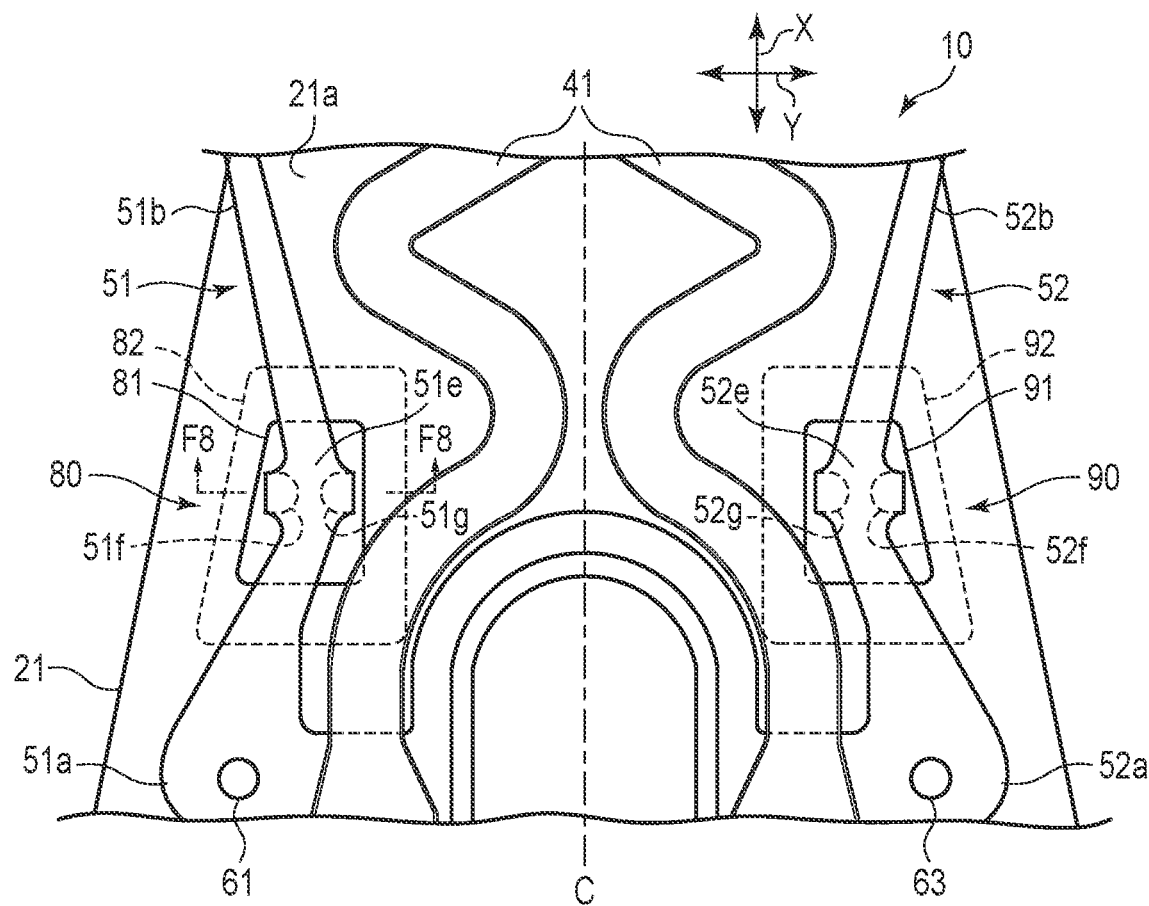
FIG. 7 is a plan view schematically showing structures of a first damping portion and a second damping portion of the suspension according to the first embodiment.
Figure 8:
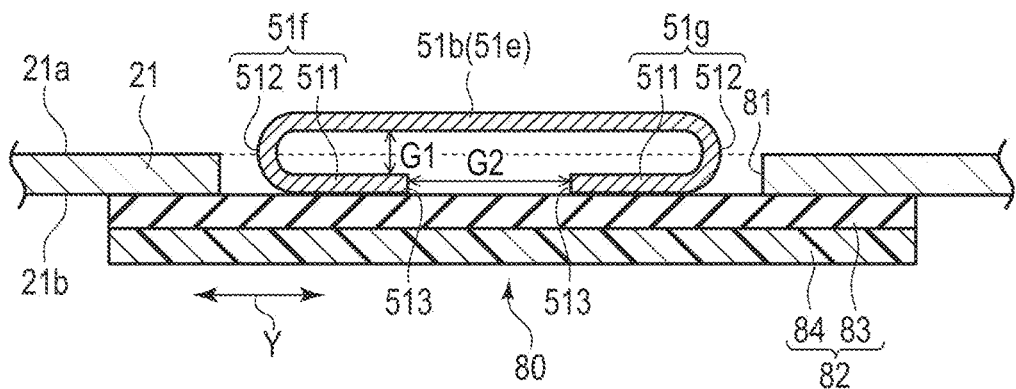
FIG. 8 is a schematic cross-sectional view of the first damping portion taken along line F8-F8 in FIG. 7.

FIG. 7 is a schematic plan view showing a structure of the suspension 10 in the vicinities of the first damping portion 80 and the second damping portion 90. FIG. 8 is a schematic cross-sectional view of the first damping portion taken along line F8-F8 in FIG. 7.

As shown in FIG. 7, the load beam 21 comprises a first opening 81 penetrating from the first surface 21a to the second surface 21b, in the vicinity of the first proximal end portion 51a. A part of the first proximal end arm 51b overlaps the first opening 81. Further, the first proximal end arm 51b includes a first bent portion 51e in a position overlapping the first opening 81. Between the first proximal end portion 51a and the first bent portion 51e, the first proximal end arm 51b extends in a direction approaching the center C along the width direction Y of the suspension 10. On the other hand, between the first bent portion 51e and the first distal end arm 51c (shown in FIG. 5), the first proximal end arm 51b extends in a direction going away from the center C1.

The first opening 81 overlaps a first damper member 82 adhered on the second surface 21b of the load beam 21. In the example shown in FIG. 7, the first damper member 82 blocks the first opening 81 entirely, but the first damper member 82 may block the first opening 81 only partially.

Further, the first outrigger 51 comprises a pair of first folded portions 51f and 51g extending from the first proximal end arm 51b in the first bent portion 51e. The first folded portion 51f is formed by folding back an extending portion from one side edge of the first proximal end arm 51b along the width direction Y towards a thickness direction of the first proximal end arm 51b. Similarly, the first folded portion 51g is formed by folding back an extending portion from the other side of the first proximal end arm 51b along the width direction Y towards a thickness direction of the first proximal end arm 51b.

In the example shown in FIG. 7, the first folded portions 51f and 51g coincide with each other in the position along the longitudinal direction X. In other words, the first folded portions 51f and 51g are arranged along the width direction Y. Further, the first folded portions 51f and 51g are folded back so that the distal portions thereof face each other.

A part of the first folded portion 51f is located below the first proximal end arm 51b, and attached to the first damper member 82 exposed within the first opening 81. Similarly, a part at the first folded portion 51g is located below the first proximal end arm 51b and attached to the first damper member 82 exposed within the first opening 81. In the present embodiment, the first opening 81, the first damper member 82 and the first folded portions 51f and 51g constitute a first damping portion 80.

The load beam 21 comprises a second opening 91 which penetrates from first surface 21a to the second surface 21b in the vicinity of the second proximal end portion 52a. The second opening 91 is blocked by a second damper member 92 attached to the second surface 21b of the load beam 21. The second damper member 92 may block only partially the second opening 91. The second damper member 92 is spaced apart from the first damper member 82 along the width direction Y.

The second proximal end arm 52b includes a second bent portion 52e. Further, the second outrigger 52 comprises a pair of second folded portions 52f and 52g extending from the second proximal end arm 52b. A part of the second folded portion 52f is located below the second proximal end arm 52b and attached to the second damper member 92 exposed within the second opening 91. Similarly, a part of the second folded portion 52g is located below the second proximal end arm 52b and attached to the second damper member 92 exposed within the second opening 91.

In the example shown in FIG. 7, the second proximal end arm 52b, the second folded portions 52f and 52g, the second opening 91 and the second damper member 92 have a line-symmetrical shape with respect to the first proximal end arm 51b, the first folded portions 51f and 51g, the first opening 81, the first damper member 82 and the center C. The second opening 91, the second damper member 92 and the second folded portions 52f and 52g constitute the second damping potion 90.

As shown in FIG. 8, the first proximal end arm 51b (the first bent portion 51e) is parallel to the first surface 21a of the load beam 21. Each of the first folded portions 51f and 51g includes a flat portion 511 located between the first proximal end arm 51b and the first damper member 82 and a curved portion 512 which joints the first proximal end arm 51b and the flat portion 511 to each other. A part of each curved portion 512 and each flat portion 511 are located within the first opening 81.

The flat portions 511 are parallel to the first proximal end arm 51b. Each curved portion 512 is curved into an arcuate shape. The flat portions 511 and the curved portions 512 are not in contact with the load beam 21. Between the flat portion 511 of each of the first folded portions 51f and 51g and the first proximal end arm 51b, there is a gap G1 provided.

The flat portions 511 of the first folded portions 51f and 51g each comprise a distal end portion 513. The distal end portions 513 oppose each other via a gap G2. In the example shown in FIG. 8, the gap G2 is greater than the gap G1 (G2>G1). As another example, the gap G2 may be less or equal to the gap G1 (G2≤G1).

The first damper member 82 comprises a viscoelastic material layer 83 and a constrained plate 84. The viscoelastic material layer 83 is formed from a high polymer material (for example, acrylic resin) which can exhibit a viscous resistance when deformed, and has a viscosity. The thickness of the viscoelastic material layer 83 is, for example, 51 μm. The constrained plate 84 is formed from a synthetic resin such as of polyester or the like, and is stacked on the viscoelastic material layer 83. The thickness of the constrained plate 84 is, for example, 51 μm.

The first damper member 82 is attached to the second surface 21b by the viscoelastic material layer 83 around the first opening 81. The flat portions 511 of the first folded portions 51f and 51g are each attached to the viscoelastic material layer 83.

The cross-sectional structure of the second damping portion 90 is similar to the cross-sectional structure of the first damping portion 80 shown in FIG. 8. More specifically, the second damper member 92 includes a viscoelastic material layer and a constrained plate. Further, the second folded portions 52f and 52g each comprise a flat portion and an bent portion, and the flat portions of the second folded portions 52f and 52g are each attached to the viscoelastic material layer of the second damper member 92.

Next, the operation of the suspension 10 according to this embodiment will be described.

When the carriage 6 (shown in FIGS. 1 and 2) is pivoted by the positioning motor 7, the suspension 10 moves in the diametrical direction of the disk 4, and thus the slider 11 of the magnetic head moves to a desired track of the recording surface of the disk 4. Then, when voltage is applied to the microactuator elements 65 and 66, the microactuator elements 65 and 66 are warped according to the voltage, and thus the load beam 21 can be moved by a small amount in the swaying direction S (shown in FIG. 3).

The suspension 10 of this embodiment comprises the damping portions 80 and 90 in the vicinities (proximal portions) of the proximal end portions 51a and 52a of the pair of outriggers 51 and 52, respectively. When energy to vibrate the flexure 22 is applied from outside, the energy is propagated to the damper members 82 and 92 via the folded portions 51f, 51g, 52f and 52g. During this period, each of the viscoelastic material layers 83 of the damper members 82 and 92 of the damping portions 80 and 90 deforms to produce internal resistance by the friction of molecules constituting the viscoelastic material layers 83. Thus, the vibration energy is converted into thermal energy, thereby making it possible to suppress shaking of the flexure 22.

Figure 9:
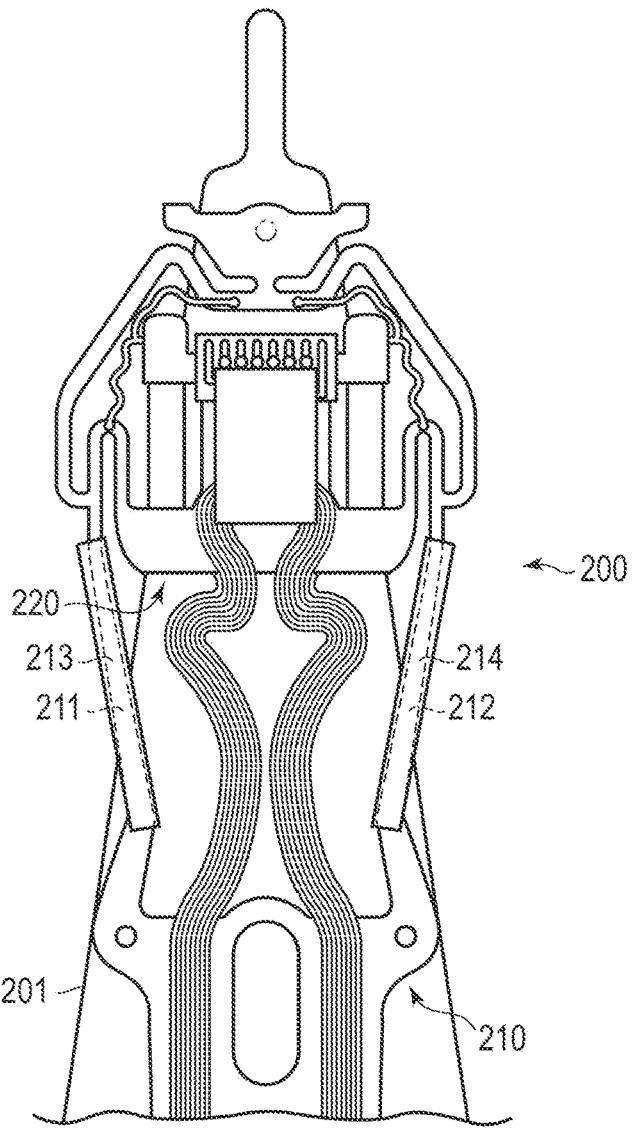
FIG. 9 is a schematic plan view of a suspension according to a comparative example.

Here, an advantageous effect of the suspension 10 according to this embodiment will be further described with reference to a comparative example. FIG. 9 is a schematic plan view of a suspension 200 according to the comparative example. The suspension 200 comprises a load beam 201, a flexure 210 including a first outrigger 211 and a second outrigger 212, and a gimbal portion 20 as in the case of the embodiment.

Further, a first damper member 213 is provided in the first outrigger 211 and a second damper member 214 is provided in the second outrigger 212. The damper members 213 and 214 are attached only to the respective outriggers 211 and 212, and they extend along the longitudinal direction of the outriggers 211 and 212.

The suspension 200 configured as above can suppress the shaking of the gimbal portion 220. However, the rigidity of the flexure increases as compared to the case where the suspension do not includes the damper members 213 and 214 as will be explained below.

Figure 10:
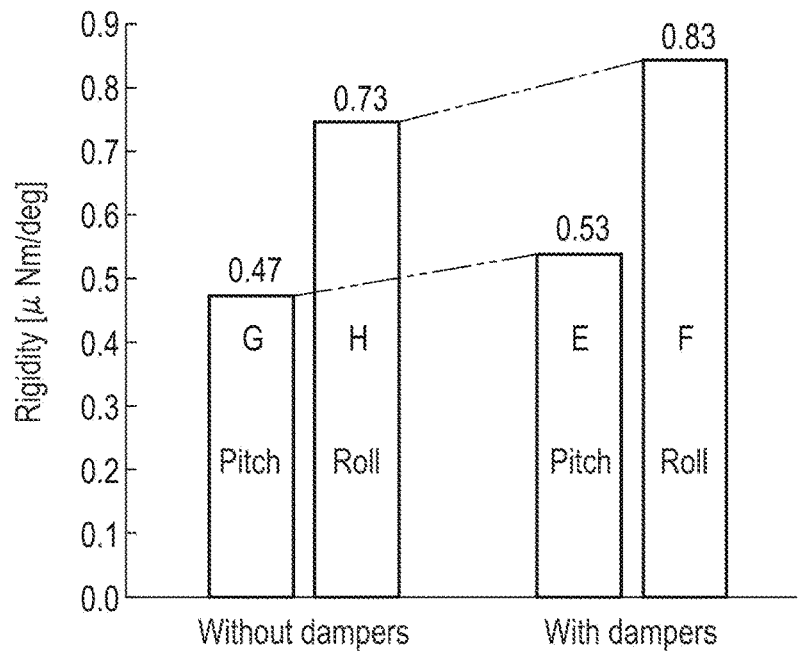
FIG. 10 is a diagram illustrating the rigidity of a flexure in each of a suspension with a damper member and a suspension without a damper member.

FIG. 10 is a graph showing the rigidity of the flexure in each of the suspension 200 including the damper members 213 and 214 as shown in FIG. 9 and a suspension which does not include damper members. Reference symbols E and F shown in FIG. 10 respectively indicate the rigidity along the pitch direction and the rigidity along the roll direction of the suspension 200 of the comparative example shown in FIG. 9. Reference symbols G and H shown in FIG. 10 respectively indicate show the rigidity along the pitch direction and the rigidity along the roll direction of the suspension which does not include the damper members 213 and 214.

As can be seen from the graph, rigidities E and F of the flexure in the suspension 200 including the damper members 213 and 214 both increased by approximately 13% as compared to the case without the damper members 213 and 214. Thus, as the rigidity increases, an adverse effect can occur in the gimbal movement in the suspension 200.

On the other hand, in the suspension 10 according to this embodiment, the folded portions 51f, 51g, 52f and 52g extending from the proximal end arms 51b and 52b of the outriggers 51 and 52 are attached to the damper members 82 and 92 via the openings 81 and 91, respectively. With such a structure, the proximal end arms 51b and 52b and the distal end arms 51c and 52c are not constrained directly by the damper members 82 and 92, and thus, the effect on the rigidity of the outriggers 51 and 52 by the damper members 82 and 92 can be suppressed.

Further, the folded portions 51f, 51g, 52f and 52g are each a portion extending respectively from the proximal end arms 51b and 52b, the effect on the function of the outriggers 51 and 52, which may be caused by bending of the folded portions can be suppressed as well.

Note that, in the suspension 200 of the comparative example shown in FIG. 9, the damper members 213 and 214 extend greatly in the longitudinal directions of the outriggers 211 and 212, respectively. The dampers materials 213 and 214 opposes a surface of the load beam on the side where the flexure 210 is placed (that is, a surface corresponding to the first surface 21a in this embodiment). A shipping comb, which is used when installing the suspension 200 in a disk drive, is brought into contact with the surface of the load beam, and therefore the shipping comb interferes with the damper members 213 and 214, thereby possibly damaging the damper members 213 and 214. On the other hand, in the suspension 10 of this embodiment, the damper members 82 and 92 are provided on the second surface 21b of the load beam 21. With such a structure, the interference between the damper members 82 and 92 and the shipping comb can be suppressed.

Further, when the folded portions 51f, 51g, 52f and 52g are not provided, a spacer needs to be provided, which propagates the vibration of the first proximal end arm 51b to the first damper member 82. On the other hand, in this embodiment, the folded portions 51f, 51g, 52f and 52g, which are parts of the outriggers 51 and 52, serve as the spacer, the number of parts can be reduced, and the manufacturing process can be also simplified.

Other than the above, various preferable advantages can be obtained from the present embodiment.

The structure of the damping portions 80 and 90 disclosed in this embodiment is only an example. The second to eighth embodiments, which will now be provided, discuss other example structures that can be applied to the damping portions 80 and 90. For the portions which are not particularly referred to in these embodiments, a structure similar to that of the first embodiment can be applied.

Second Embodiment

Figure 11:
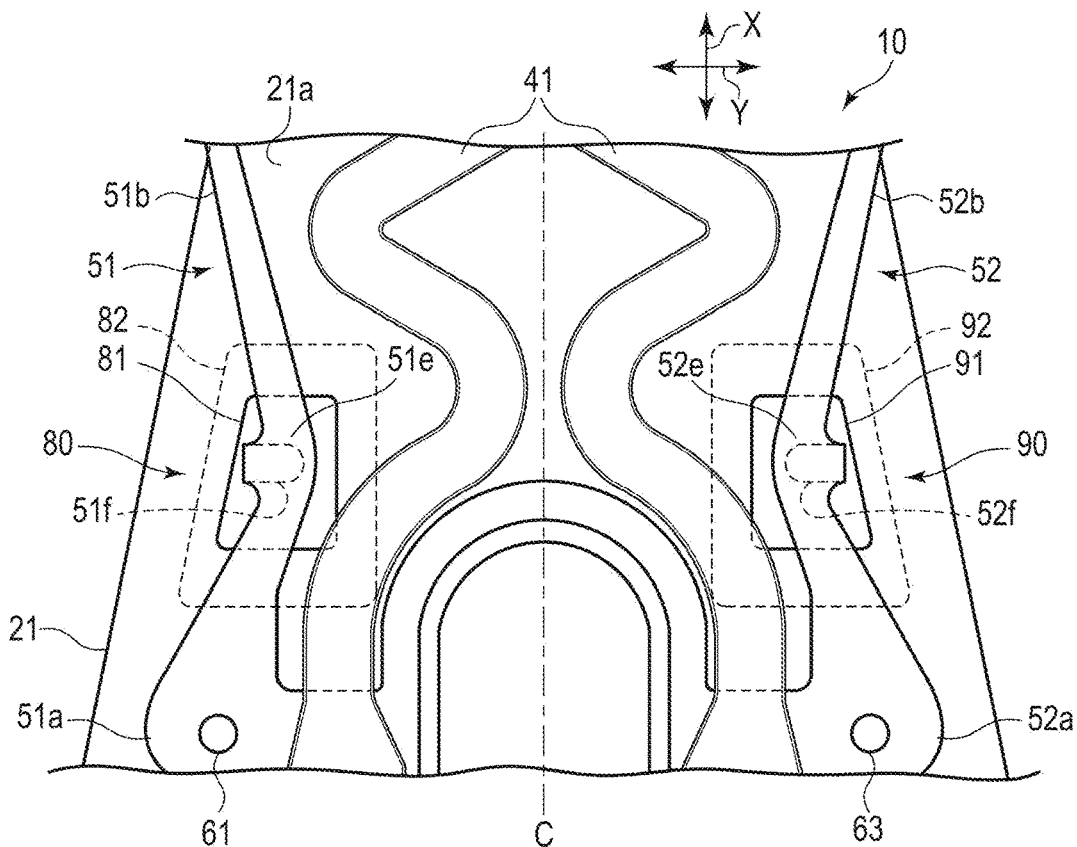
FIG. 11 is a schematic plan view of a suspension according to the second embodiment.

FIG. 11 is a schematic plan showing a part of a suspension 10 according the second embodiment. This suspension 10 is different from that of the example shown in FIG. 7 in that the first outrigger 51 does not comprise a first folded portion 51g, and further the second outrigger 52 does not comprise the second folded portion 52g.

From the point of view that the outriggers 51 and 52 are appropriately attached to the damper members 82 and 92, respectively, to increase the damping force, it is preferable to, for example, provide two folded portions for each of the outriggers 51 and 52 as in the case of the first embodiment, thereby increasing the contact area between the damper members 82 and 92 and the folded portions. Note that it is also possible to inhibit swinging of the flexure 22 even with the structure of this embodiment that the first outrigger 51 comprises one first folded portion 51f and the second outrigger 52 comprises one second folded portion 52f.

The first folded portion 51f shown in FIG. 11 has a shape elongated along the width direction Y further than that of the first folded portion 51f shown in FIG. 7. Similarly, the second folded portion 52f shown in FIG. 11 has a shape elongated along the width direction Y further than that of the second folded portion 52f shown in FIG. 7. Thus, when the folded portions 51f and 52f are increased in size, the contact area between the folded portions 51f and 52f and the damper members 82 and 92 increases, the damping force of the damping portions 80 and 90 can be enhanced.

Note that the folded portions 51f and 52f in FIG. 11 may be provided in positions of the folded portions 51g and 52g shown in FIG. 7, respectively. The number of folded portions of the first outrigger 51 or the second outrigger 51 is not limited to two in the first embodiment or one in this embodiment, but it may be three or more.

Third Embodiment

Figure 12:
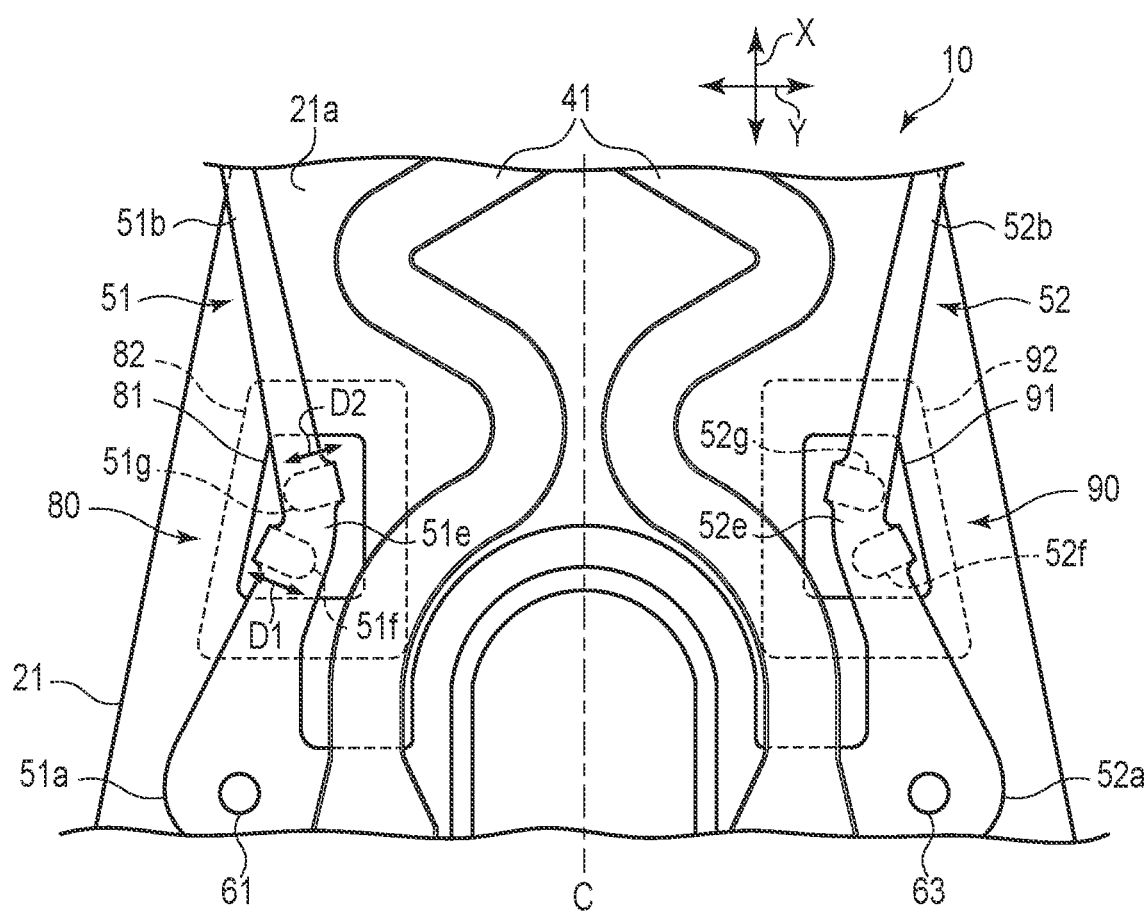
FIG. 12 is a schematic plan view of a suspension according to the third embodiment.

FIG. 12 is a schematic plan showing a part of a suspension 10 according to the third embodiment. This suspension 10 is different from that of the example shown in FIG. 7 in the positions of the first folded portions 51f and 51g and the second folded portions 52f and 52g.

In an example shown in FIG. 12, the positions of the first folded portions 51f and 51g are displaced along the longitudinal direction X (or an extending direction of the first proximal end arm 51b). More specifically, the first folded portion 51f is located bent portion 51e and the first proximal end portion 51a and the first folded portion 51g in located between the first bent portion 51e and the first distal end arm 51c (shown in FIG. 5).

Similarly, the positions of the second folded portions 52f and 52g as well are displaced along the longitudinal direction X (or an extending direction of the second proximal end arm 52b). More specifically, the second folded portion 52f is located between the second bent portion 52e and the second proximal end portion 52a and the second folded portion 52g is located between the second bent portion 52e and the second distal end arm 52c (shown in FIG. 5).

In the example shown in FIG. 12, the first folded portion 51f extends in a first extending direction D1. On the other hand, the first folded portion 51g extends in a second extending direction D2 different from the first extending direction D1. The extending directions D1 and D2 are directions intersecting, for example, the longitudinal direction X and the width direction Y. Similarly, the second folded portions 52f and 52g also extend in directions different from each other.

The first folded portions 51f and 51g shown in FIG. 12 are longer than those of the example shown in FIG. 7. Even in such a case, because the first folded portions 51f and 51g are displaced along the longitudinal direction X, the first folded portions 51f and 51g are not brought into contact with each other under the first proximal end arm 51b. Therefore, with the structure shown in FIG. 12, the contact area between the first the folded portions 51f and 51g and the first damper member 82 can be increased, and the damping force can be enhanced. Thus, a similar advantageous effect can be also obtained by the second folded portions 52f and 52g as well.

Fourth Embodiment

Figure 13:
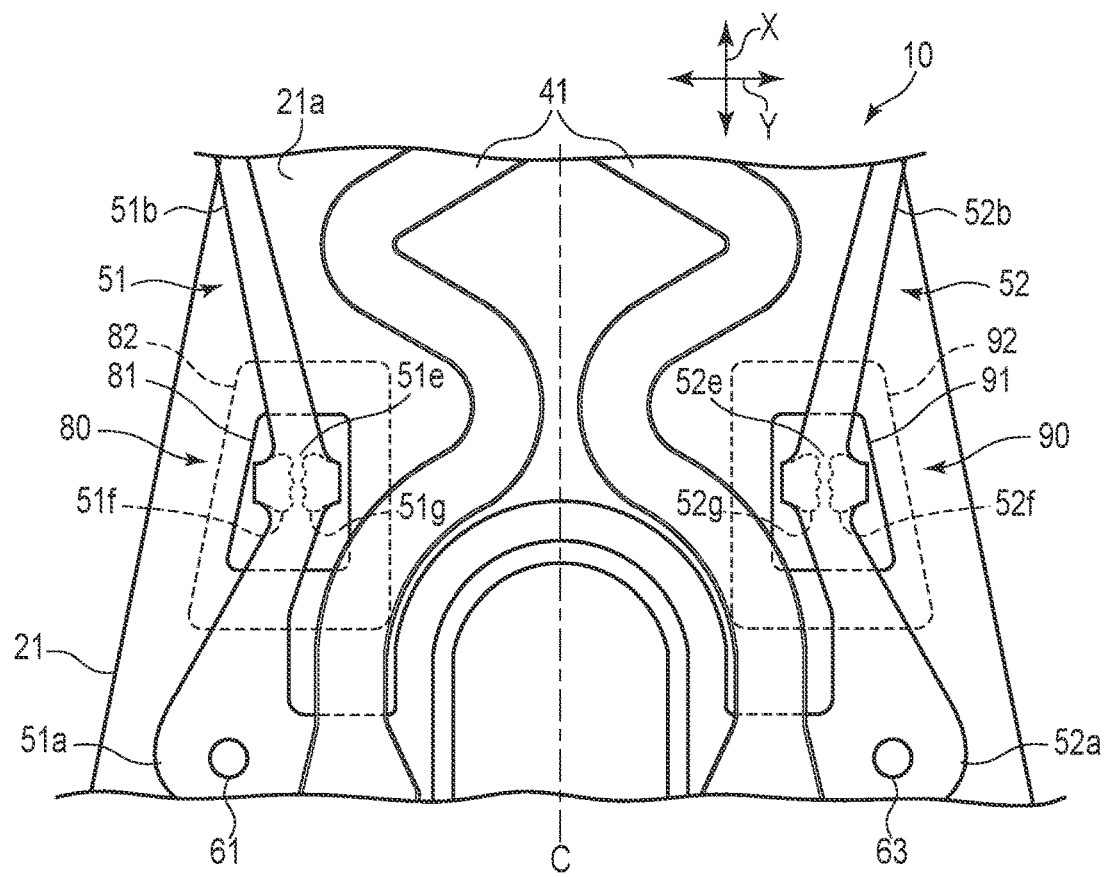
FIG. 13 is a schematic plan view of a suspension according to the fourth embodiment.

FIG. 13 is a schematic plan showing a part of a suspension 10 according to the fourth embodiment. This suspension 10 is different from that of the example shown in FIG. 7 the shapes of the first folded portions 51f and 51g and the second folded portions 52f and 52g. More specifically, the first folded portions 51f and 51g each expand along the longitudinal direction X below the first proximal end arm 51b and also a distal end thereof meanders. Similarly, the second folded portions 52f and 52g each expand along the longitudinal direction X below the second proximal end arm 52b, and also a distal end thereof meanders.

Figure 14:
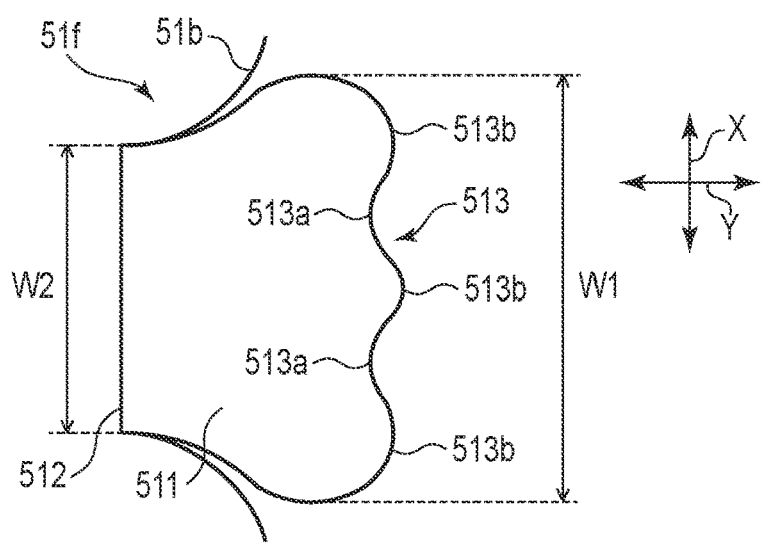
FIG. 14 is a plan view showing an example of the shape of a folded portion in the fourth embodiment.

FIG. 14 is a plan view showing an example of the shape of the first folded portion 51f in this embodiment, which is equivalent to a plan view of the first folded portion 51f as seen from the side of the second surface 21b of the load beam 21. A similar shape can be also applied to each of the first folded portion 51g and the second folded portions 52f and 52g.

In the first folded portion 51f shown in FIG. 14, a distal end portion 513 of the flat portion 511 comprises two recess portions 513a recessed in the width direction Y. From another point of view, the distal end portion 513 comprises three protruding portions 513b each located next to the respective recess portion 513a. Note that in the distal end portion 513, the number of the recess portions 513a and that of the protruding portions 513b may be more or less than those in the illustrated example.

When the distal end portion 513 is made to comprise recess portions 513a and protruding portions 513b as described above, into a non-linear manner, the distal end portion 513 digs into the first damper member 82 and thus the detachment of the flat portion 511 and the first damper member 82 from each other can be inhibited.

Further, in the first folded portion 51f shown in FIG. 14, a width W1 of the flat portion 511 along the longitudinal direction X is greater than a width W2 of the curved portion 512 along the longitudinal direction X. Thus, the area of the flat portion 511, which is in contact with the first damper member 82, is increased, the detachment of the flat portion 511 and the first damper member 82 from each other can be more reliably inhibited.

Note that the shape shown as an example in FIG. 14 may be applied to all of the folded portions 51f, 51g, 52f and 52g or to only some of them. Further, the shape shown as an example in FIG. 14 can be applied to the folded portions disclosed in the other embodiments.

Fifth Embodiment

Figure 15:
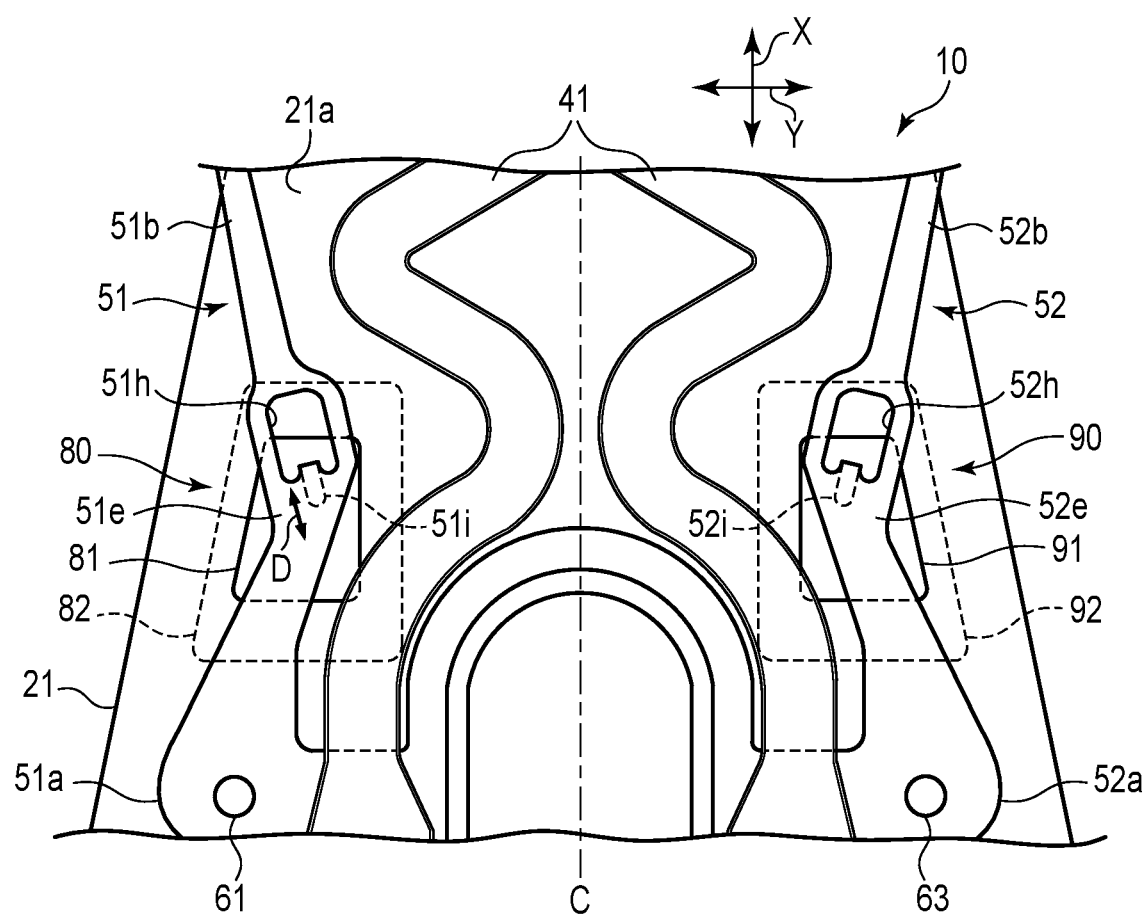
FIG. 15 is a schematic plan view of a suspension according to the fifth embodiment.

FIG. 15 is a schematic plan view showing a part of a suspension 10 according to the fifth embodiment. In this suspension 10, the first proximal end arm 51b of the first outrigger 51 comprises a first arm opening 51h in the vicinity of the first bent portion 51e. The first arm opening 51h at least partially overlaps the first opening 81. Further, the first outrigger 51 comprises a first folded portion 51i extending from an inner edge of the first arm opening 51h.

As in the case of the first folded portions 51f and 51g shown in FIG. 8, the first folded portion 51i is folded back in the thickness direction of the first proximal end arm 51b and attached to the first damper member 82 under the first proximal end arm 51b. In an example shown in FIG. 15, an extending direction D of the first folded portion 51i is inclined to both the longitudinal direction X and the width direction Y.

In the example shown in FIG. 15, the second outrigger 52, the second opening 91 and the second damper member 92 have a line-symmetrical shape with respect to the first outrigger 51, the first opening 81, the first damper member 82 and the center C. That is, the second proximal end arm 52b comprises a second arm opening 52h, and a second folded portion 52i extends from an inner edge of the second arm opening 52h. The second folded portion 52i is folded back in the thickness direction of the second proximal end arm 52b and attached to the second damper member 92.

As in this embodiment, when the first folded portion 51i is provided inside the first arm opening 51h, the first proximal end arm 51b can be fixed in excellent balance near the center along the width direction. Similarly, the second proximal end arm 52b can be fixed in excellent balance near the widthwise center when the second folded portion 52i is provided inside the second arm opening 52h.

Sixth Embodiment

Figure 16:
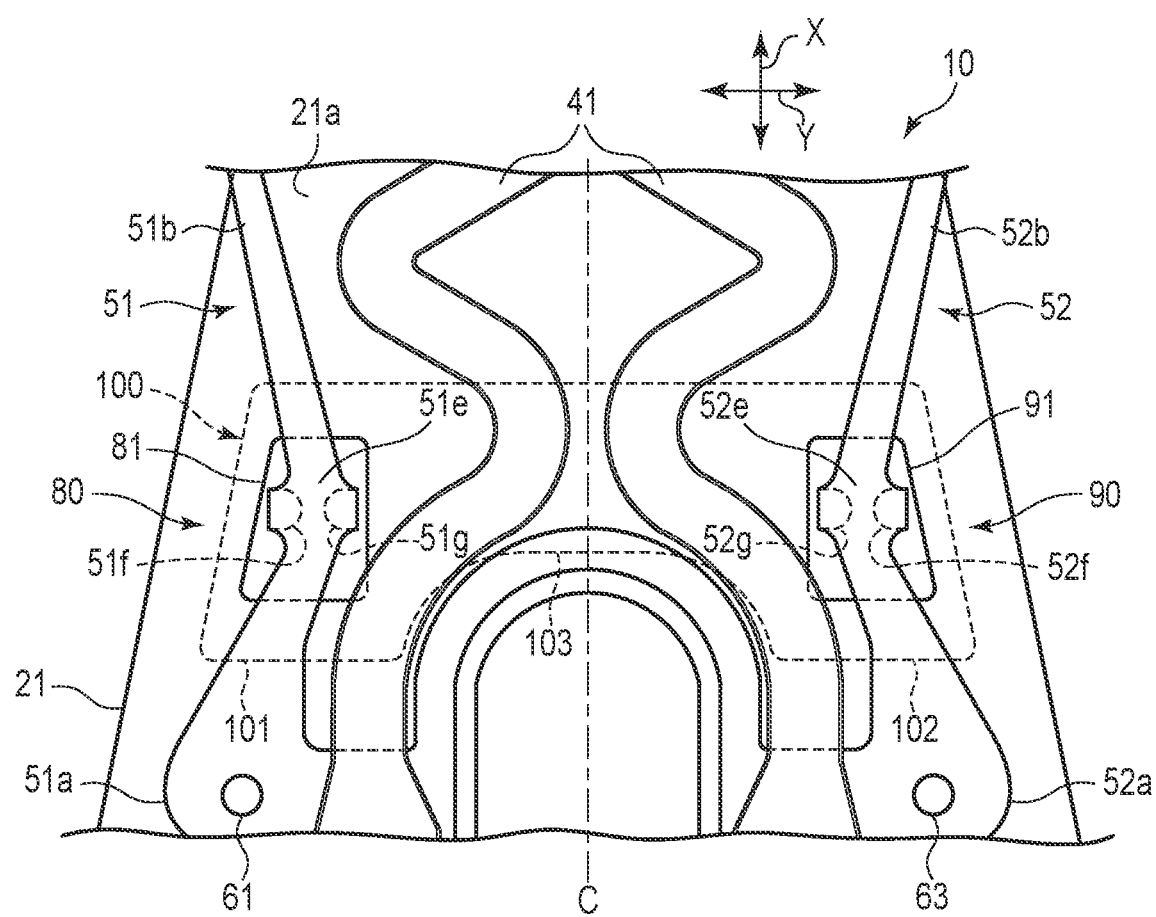
FIG. 16 is a schematic plan view of a suspension according to the sixth embodiment.

FIG. 16 is a schematic plan view showing a part of a suspension 10 according to the sixth embodiment. This suspension 10 is different from that of the example shown in FIG. 7 in comprising a damper member 100 which overlaps both of the first outrigger 51 and the second outrigger 52, in place of the first damper member 82 and the second damper member 92 discussed above.

The damper member 100 is attached to the second surface 21b (shown in FIG. 3) of the load beam 21. To the damper member 100, a structure similar to that of the first damper member 82 shown in FIG. 8 can be applied.

The damper member 100 includes a first portion 101 overlapping the first opening 81, a second portion 102 overlapping the second opening 91 and a middle portion 103 which joints the first portion 101 and the second portion 102 to each other. The middle portion 103 overlaps two wiring portions 41. In the example shown in FIG. 16, a width of the middle portion 103 along the longitudinal direction X is less than widths of the first portion 101 and the second portion 102 along the longitudinal direction X.

The first folded portions 51f and 51g are attached the first portion 101 via the first opening 81. The second folded portions 52f and 52g are attached to the second portion 102 via the second opening 91.

With the structure of this embodiment, which damps the vibration of both the outriggers 51 and 52 by one damper member 100, the number of parts of the suspension 10 can be reduced and the manufacturing process can be simplified as compared to the case where two damper members 82 and 92 are employed. Further, the adhesion area between the damper member 100 and the load beam 21 is increased, and therefore the damper member 100 hardly detaches from the load beam 21.

The structure of this embodiment can be achieved by the damper member 100 being attached on the second surface 21b of the load beam 21. In other words, if the damper member 100 is attached to the first surface 21a, the damper member 100 constrains the wiring portions 41, which may cause an adverse effect on the rigidity and the gimbal movement of the flexure 22. On the other hand, if the damper member 100 is attached on the second surface 21b, the wiring portions 41 are not constrained, thereby inhibiting the effect on the rigidity or the gimbal movement of the flexure 22.

Note that in the suspension 10 of the other embodiments, the damper member 100 may be employed in place of the first damper member 82 and the second damper member 92 as in this embodiment.

Seventh Embodiment

Figure 17:
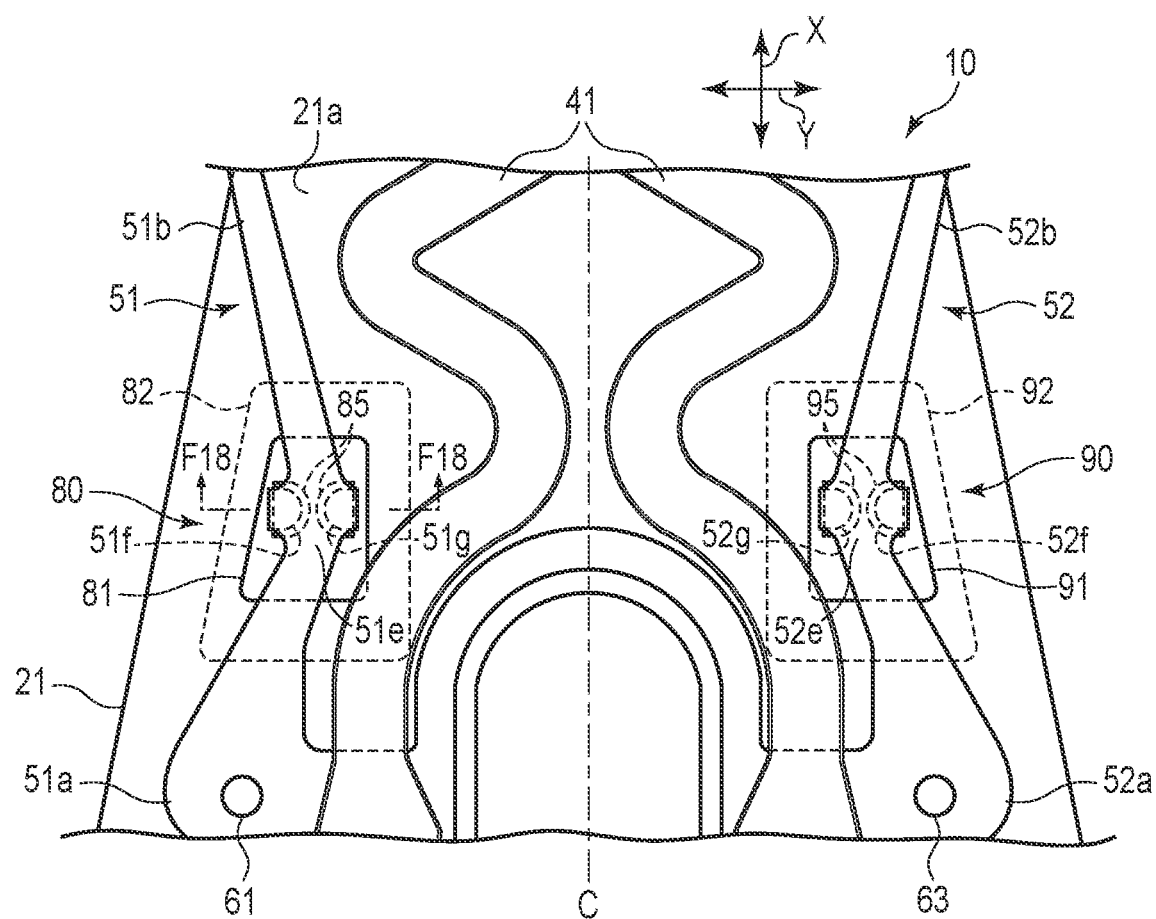
FIG. 17 is a schematic plan view of a suspension according to the seventh embodiment.

FIG. 17 is a schematic plan view showing a part of a suspension 10 according to the seventh embodiment. The basic structure of this suspension 10 is similar to that of the example shown in FIG. 7. But, the suspension 10 shown in FIG. 17 is different from that of the example shown in FIG. 7 in that the first damping portion 80 comprises a pair of first insulating layers 85 and the second damping portion 90 comprises a pair of second insulating layers 95.

The pair of first insulating layers 85 overlap the first folded portions 51f and 51g, respectively, in the first opening 81. The pair of second insulating layers 95 overlap the second folded portions 52*f* and 52*g*, respectively, in the second opening 91.

FIG. 18 is a schematic cross-sectional view of the first damping portion 80 taken along line F18-F18 shown in FIG. 17. The first insulating layers 85 are formed on respective outer surfaces (surfaces opposing the first damper member 82) of the flat portions 511 of the first folded portions 51*f* and 51*g*.

The first insulating layers 85 are each interposed between the respective flat portion 511 and the first damper member 82. That is, in this embodiment, the flat portions 511 are attached on the first damper member 82 through the first insulating layers 85, respectively.

In the example shown in FIG. 18, a thickness of the first insulating layer 85 is less than thicknesses of the load beam 21 and the flat portion 511. The first insulating layers 85 can be each formed by applying, for example, polyimide onto the respective flat portion 511, following by hardening. Note that the wiring portion 41 also includes an insulating layer formed of polyimide. The first insulating layer 85 and the insulating layer of the wiring portion 41 may be formed in the same manufacturing process by forming a film of polyimide on the flat flexure 22 before the first folded portions 51*f* and 51*g* are bent, and then patterning them.

In the example shown in FIG. 18, each of the first insulating layers 85 projects out from a distal end portion 513 of each of the first folded portions 51*f* and 51*g*. As shown in FIG. 17, the first insulating layers 85 project out from both sides (both sides of the flat portions 511) of the first folded portions 51*f* and 51*g* along the longitudinal direction X as well.

As described above, when each of the first insulating layers 85 is formed to be greater in size than the first folded portions 51*f* and 51*g*, the first folded portions 51*f* and 51*g* are adhered stably to the first damper member 82. As a result, the damping effect by the first damper member 82 can be improved. Further, it is also possible to inhibit the first folded portions 51*f* and 51*g* from being damaged, which may be caused when the flexure 22 is brought into contact with a bending tool during the formation of the first folded portions 51*f* and 51*g* by bending the flexure.

On the other hand, in the example shown in FIG. 18, the first insulating layers 85 do not reach the respective curved portions 512 of the first folded portions 51*f* and 51*g*. With this structure, it is difficult to inhibit the deformation of the first folded portions 51*f* and 51*g* in the bending process. Further, damage of the first insulating layer 85, which may be caused by the bending, can be suppressed.

A cross-sectional structure of the second damping portion 90 is also similar to a cross-sectional structure of the first damping portion 80 shown in FIG. 18. That is, the second insulating layers 95 are formed respectively on the flat portions of the second folded portions 52*f*, 52*g* and they are located respectively between the flat portions and the second damper member 92.

Note that the structure of this embodiment in which the insulating layers 85 and 95 are provided can be similarly applied to the suspensions 10 of the other embodiments as well. The insulating layers 85 and 95 may be provided on only respective parts of folded portions of the outriggers 51 and 52.

Eighth Embodiment

FIG. 19 is a schematic plan view showing a part of a suspension 10 according to the eighth embodiment. This suspension 10 is different from the example shown in FIG. 7 in that the second outrigger 52 does not comprise a second folded portion 52*g*.

That is, in the example shown in FIG. 19, the number of folded portions of the first outrigger 51 is greater than the number of folded portions of the second outrigger 52. As another example, the number of the folded portions of the second outrigger 52 may be greater than the number of the folded portions of the first outrigger 51.

Even if the structure of the first damping portion 80 and the structure of the second damping portion 90 are asymmetrical with respect to each other as described above, the damping effect of the outriggers 51 and 52 can be obtained. Examples in which the first damping portion 80 and the structure of the second damping portion 90 are asymmetrical with respect to each other, other than the case where the number of the folded portions differs between the outriggers 51 and 52, include the case where the extending directions of the folded portions differ between the outriggers 51 and 52, the case where the positions of the folded portions along the longitudinal direction X differ between the outriggers 51 and 52, the case where the shapes or positions of the openings 81 and 91 are different, and the case where the shapes and the positions of the damper member 82 and 92 are different, and the like.

When carrying out the inventions disclosed in the above-provided embodiments, specific modes not only the shapes of the load beam and the flexure, or the arrangement of the first damping portion and the second damping portion, but also various elements which constitute the suspension for disk drives can be changed. For example, a first damping portion and a second damping portion similar to those of each of the embodiments may be provided for a suspension which does not comprise microactuator elements 65 and 66.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A suspension for a disk device, the suspension comprising:
   a load beam;
   a flexure overlapping the load beam, the flexure comprising a tongue on which a slider is mounted and an outrigger connected to the tongue; and
   a damper member attached to the load beam,
   wherein:
   the outrigger comprises an arm opposing the load beam, and a folded portion extending from the arm and folded in a thickness direction of the arm, and
   the folded portion is attached to the damper member.

2. The suspension of claim 1, wherein:
   the load beam comprises a first surface, a second surface on an opposite side to the first surface, and an opening which penetrates from the first surface to the second surface,
   the outrigger is disposed at the first surface side,
   the damper member is attached to the second surface and overlaps at least a part of the opening, and
   the folded portion is attached to the damper member through the opening.

3. The suspension of claim 2, wherein:
the arm comprises a bent portion overlapping the opening, and the folded portion extends from the bent portion.

4. The suspension of claim 1, wherein the outrigger folded portion comprises a pair of folded portions which extend from respective sides of the load beam in a width direction of the load beam.

5. The suspension of claim 4, wherein the pair of folded portions are arranged along a width direction of the arm.

6. The suspension of claim 4, wherein the folded portions of the pair of folded portions are provided at positions displaced from each other along an extending direction of the arm.

7. The suspension of claim 1, wherein a distal portion of the folded portion comprises at least one recess portion or projecting portion.

8. The suspension of claim 1, wherein:
the arm comprises an opening, and
the folded portion extends from an inner edge of the opening.

9. The suspension of claim 1, further comprising an insulating layer disposed between the folded portion and the damper member,
wherein the folded portion is attached to the damper member via the insulating layer.

10. The suspension of claim 1, wherein:
the outrigger comprises a pair of outriggers, each of the pair of the outriggers including the arm and the folded portion, and
the damper member comprises a pair of damper members, each of the pair of damper members being provided for a respective one of the pair of outriggers, and the pair of damper members being spaced apart from each other.

11. The suspension of claim 1, wherein:
the outrigger comprises a pair of outriggers, each of the pair of the outriggers including the arm and the folded portion, and
the damper member has such a size as to overlap both of the pair of outriggers.

* * * * *